United States Patent
Kopp

(10) Patent No.: US 8,627,655 B2
(45) Date of Patent: Jan. 14, 2014

(54) METHOD AND DEVICE FOR PRODUCING AMMONIA FOR THE EXHAUST GAS TREATMENT IN INTERNAL COMBUSTION ENGINES IN A MOTOR VEHICLE

(75) Inventor: Andre Kopp, Neckarsulm (DE)

(73) Assignee: Audi, AG, Ingolstadt (DE)

( * ) Notice: Subject to any disclaimer, the term of this patent is extended or adjusted under 35 U.S.C. 154(b) by 336 days.

(21) Appl. No.: 12/526,713

(22) PCT Filed: Nov. 16, 2007

(86) PCT No.: PCT/EP2007/009899
§ 371 (c)(1),
(2), (4) Date: Aug. 11, 2009

(87) PCT Pub. No.: WO2008/098598
PCT Pub. Date: Aug. 21, 2008

(65) Prior Publication Data
US 2010/0107607 A1    May 6, 2010

(30) Foreign Application Priority Data

Feb. 16, 2007   (DE) .......................... 10 2007 008 577

(51) Int. Cl.
*F01N 3/20*    (2006.01)
*F01N 11/00*   (2006.01)

(52) U.S. Cl.
USPC ................... 60/311; 60/285; 60/286; 60/295; 60/301; 123/25 A; 123/25 B; 123/25 C; 123/25 D; 123/25 E; 123/25 F; 123/25 G; 123/25 H; 123/25 I; 123/25 J; 123/25 K; 123/25 L; 123/25 M; 123/25 N; 123/25 O; 123/25 P; 123/25 Q

(58) Field of Classification Search
USPC ................... 60/285, 286, 295, 301, 309, 311; 123/25 A–25 Q, 698
See application file for complete search history.

(56) References Cited

U.S. PATENT DOCUMENTS

| | | | | |
|---|---|---|---|---|
| 3,832,848 A | * | 9/1974 | Scholl | 60/274 |
| 3,983,882 A | * | 10/1976 | Billings | 123/1 A |
| 5,197,444 A | * | 3/1993 | Lang et al. | 123/514 |
| 2003/0056499 A1 | * | 3/2003 | Binder et al. | 60/295 |
| 2006/0153761 A1 | * | 7/2006 | Bandl-Konrad et al. | 423/239.1 |
| 2007/0028601 A1 | * | 2/2007 | Duvinage et al. | 60/286 |
| 2007/0137590 A1 | * | 6/2007 | Vetrovec | 123/25 A |

FOREIGN PATENT DOCUMENTS

| | | |
|---|---|---|
| DE | 19903533 A1 | 8/2000 |
| EP | 1149622 A | 10/2001 |

* cited by examiner

*Primary Examiner* — Thomas Denion
*Assistant Examiner* — Brandon Lee
(74) *Attorney, Agent, or Firm* — Novak Druce Connolly Bove + Quigg LLP

(57) ABSTRACT

A method for producing ammonia for treating exhaust gas in internal combustion engines in a motor vehicle proposes that the internal combustion engine is operated with an air/fuel ratio $\lambda < 1.0$, and water is added to the air/fuel mixture supplied to the internal combustion engine in order to produce the ammonia required for treating the exhaust gas on board the vehicle. And in a device for implementing the method with a means for determining the air/fuel ratio $\lambda$ of the air/fuel mixture supplied to the internal combustion engine, it is proposed that an addition means for adding water to the air/fuel mixture be provided in order to produce the ammonia required for exhaust gas treatment on board the motor vehicle, the addition means being controllable depending on the determined air/fuel ratio $\lambda$.

6 Claims, 2 Drawing Sheets

METHOD AND DEVICE FOR PRODUCING AMMONIA FOR THE EXHAUST GAS TREATMENT IN INTERNAL COMBUSTION ENGINES IN A MOTOR VEHICLE

This invention relates to a method for producing ammonia for treating exhaust gas in internal combustion engines in a motor vehicle and a device for implementing the method.

BACKGROUND OF THE INVENTION

Legal requirements are, for instance, further reducing the allowable boundary values for nitrogen oxides in the exhaust gas of internal combustion engines. To meet these requirements, adding ammonia ($NH_3$) to the exhaust gas in order to convert the nitrogen oxides (NO and $NO_2$) contained in it into the environmentally safe compounds nitrogen ($N_2$) and water ($H_2O$) is known.

Essentially, ammonia or ammonia precursors such as urea or ammonium carbamate can be made available for treatment of motor vehicle exhaust gas by means of a special tank. To make available an amount of ammonia sufficient for the service life of the vehicle, this tank must be very large. But generally there is not enough room for this purpose. When using smaller tanks it is necessary to refill them in the interim. It should be noted when filling tanks that this activity must be performed by specialized automotive service centers in order to preclude poisoning or odor nuisance.

Moreover, ammonia can, however, also be produced directly on board the motor vehicle. Thus, documents DE 103 37 901 A1 and DE 199 03 533 A1 disclose methods for synthesis of ammonia by means of a plasma-catalytic reactor located in the exhaust gas line of the internal combustion engine. These synthesis methods are however comparatively complex, fault-susceptible and moreover expensive.

Finally, document DE 196 54 977 C2 discloses a method for reducing nitrogen oxides and black smoke. For this reason, in a diesel engine operated lean, water is injected into the combustion chamber. Vaporizing the injected water reduces the combustion temperatures so that fewer nitrogen oxides are formed. The water to be injected is obtained there from the exhaust gas of the diesel engine.

Furthermore, document DE 196 48 219 C1 discloses a device for separating water from combustion exhaust gases. The water obtained in this manner can be used in the most varied ways, as a result of which carrying a separate water tank in the vehicle can be eliminated.

Against this background, the object of this invention is to make available an improved method for producing ammonia for treating exhaust gas in internal combustion engines in a motor vehicle. Moreover, the object of the invention is also to devise a device for implementing the method.

SUMMARY OF THE INVENTION

According to the method, this object is achieved by the internal combustion engine being operated with an air/fuel ratio $\lambda<1.0$, that is to say, rich, and by water being added to the air/fuel mixture supplied to the internal combustion engine in order to produce the ammonia required for treating the exhaust gas on board the vehicle. For a deficiency of air it is ensured that a sufficient amount of hydrogen is generated in the combustion chamber which is converted into ammonia, specifically in rich operation of the internal combustion engine with the nitrogen oxides stored or present in the exhaust gas flow. Thus, ammonia, which can be used for reducing pollution, is ultimately formed easily and still very effectively by way of different successive reactions of the mixture or the exhaust gas by this combination of features.

Advantageously, the amount of water added is determined depending on the air/fuel ratio $\lambda$ supplied to the internal combustion engine. This is because the air/fuel ratio influences the amount of nitrogen oxides which are generated in the exhaust gas and which are to be converted.

Alternatively or in addition, the amount of added water can also be determined depending on the signal of a nitrogen oxide sensor located in the exhaust gas line.

Preferably, after completed exhaust gas treatment with ammonia, water from the exhaust gas is recirculated, the water added to the air/fuel mixture being supplied by the water recirculated from the exhaust gas. In this way a closed circuit is formed so that supply with water is ensured at any instant.

Especially preferably, the water recirculated from the exhaust gas is obtained by a condensation process. For this purpose, the exhaust gas is cooled by a heat exchanger to below the dew point and the separated water is captured and stored or relayed.

Advantageously, the amount of water recirculated from the exhaust gas is greater than or equal to the amount of added water. This ensures that there is always a sufficient amount available for adding water to the air/fuel mixture.

According to the device, this object is achieved in that for the device equipped with a means for determining the air/fuel ratio $\lambda$ of the air/fuel mixture supplied to the internal combustion engine there is an addition means for adding water to the air/fuel mixture in order to produce the ammonia necessary for exhaust gas treatment on board the motor vehicle, the addition means operating as a function of the determined air/fuel ratio $\lambda$. By means of these features separate storage means for ammonia or ammonia precursors and complex generators for producing ammonia can be dispensed with. Moreover, this control allows optimum metering of water so that on the one hand a sufficient amount of ammonia is formed and on the other hand the combustion process within the internal combustion engine is adversely affected only as little as necessary.

Moreover, depending on the signal of a nitrogen oxide sensor located in the exhaust gas line the addition means can be controlled in order to also take into account the dynamic behavior of the $NO_x$ storage catalytic converter and thus to achieve even more precise metering of the added water.

The addition means is coupled upstream from the internal combustion engine in the negative pressure region in order to facilitate addition of water to the air/fuel mixture and in order to achieve thorough mixing of water and air/fuel mixture as uniform as possible, as a result of which the formation of ammonia is effectively supported.

Treatment of the exhaust gas mixed with ammonia advantageously takes place by means of a soot filter, a $NO_x$ storage catalytic converter and an SCR catalytic converter which are located in succession in the exhaust gas line of the internal combustion engine.

If, moreover, there is a recirculation means to return the water from the exhaust gas to the internal combustion engine downstream from the exhaust gas treatment with ammonia, the addition means can be supplied from a recirculating means. This eliminates the need for a separate storage tank for water. Recirculation of water can take place during rich operation as well as during lean operation of the internal combustion engine.

According to one development, this recirculating means is coupled to the exhaust gas line of the internal combustion engine and is made as a condensation means. Such a condensation means comprises a heat exchanger which also operates properly in the region connected downstream from the exhaust gas treatment means.

The recirculating means can be especially advantageously controlled depending on the addition means. This is because the supply means indicates how much water is being added so that it is found therefrom how much water is needed to supply the addition means. Excess water can be directly avoided by the heat exchanger being throttled in its performance or turned off. Alternatively, excess water could also be released simply into the exterior since it does not constitute an environmental burden.

Alternatively or in addition, the recirculating means can, however, also have a storage tank with a fill level means and can be controlled depending on the fill level means. Such a storage tank with a fill level means constitutes a certain buffer for water supply and can, moreover, also be economically implemented.

BRIEF DESCRIPTION OF THE DRAWINGS

Figure 1:
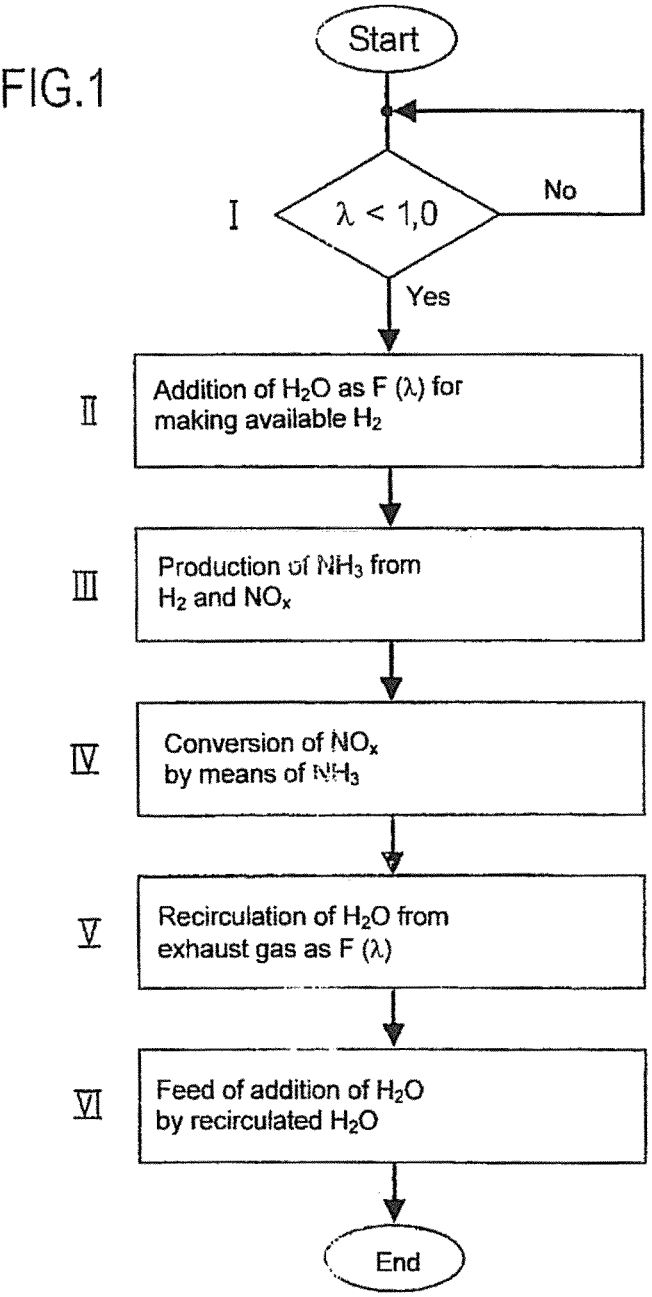
FIG. 1 shows a simplified flow chart of the method for producing ammonia for exhaust gas treatment.

The method shown in FIG. 1 calls for the internal combustion engine 2 to be operated with an air deficit and for water $H_2O$ to be added to the supplied air/fuel mixture in order to produce the ammonia $NH_3$ necessary for exhaust gas treatment.

For this reason, in the first step I of the method it is checked whether the air/fuel ratio is $\lambda<1.0$. If this is the case, water is added to the air/fuel mixture in the second step II depending on the actual air/fuel ratio $\lambda$ so that using the following chemical reactions

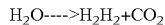
$$H_2O \longrightarrow H_2H_2+CO_2$$

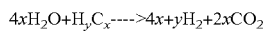
$$4xH_2O+H_yC_x \longrightarrow 4x+yH_2+2xCO_2$$

first an increased amount of hydrogen $H_2$ is made available. Then, in the exhaust gas line of the internal combustion engine 2 by the reaction of hydrogen $H_2$ with the nitrogen oxides $NO_x$ contained in the exhaust gas using the succeeding reaction

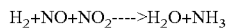
$$H_2+NO+NO_2 \longrightarrow H_2O+NH_3$$

ammonia $NH_3$ is produced. This is illustrated in the flow chart by step III. By means of the ammonia $NH_3$ which has been produced in this way conversion of the remaining nitrogen oxides $NO_x$ is finally carried out, according to the reaction

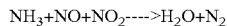
$$NH_3+NO+NO_2 \longrightarrow H_2O+N_2$$

water $H_2$ and nitrogen $N_2$ are produced; this corresponds to step IV in FIG. 1. After exhaust gas treatment the purified hot exhaust gas is cooled, for example, by means of a heat exchanger means to below the dew point and thus water $H_2O$ is separated from the exhaust gas. This recirculation of water $H_2O$ which takes place ideally depending on the supplied air/fuel ratio $\lambda$ or the signal of a nitrogen oxide sensor located in the exhaust gas line 4, corresponds to step V of the illustrated, method. Finally, the recirculated water $H_2O$ according to step VI is used for supply of the addition of water $H_2O$.

Figure 2:
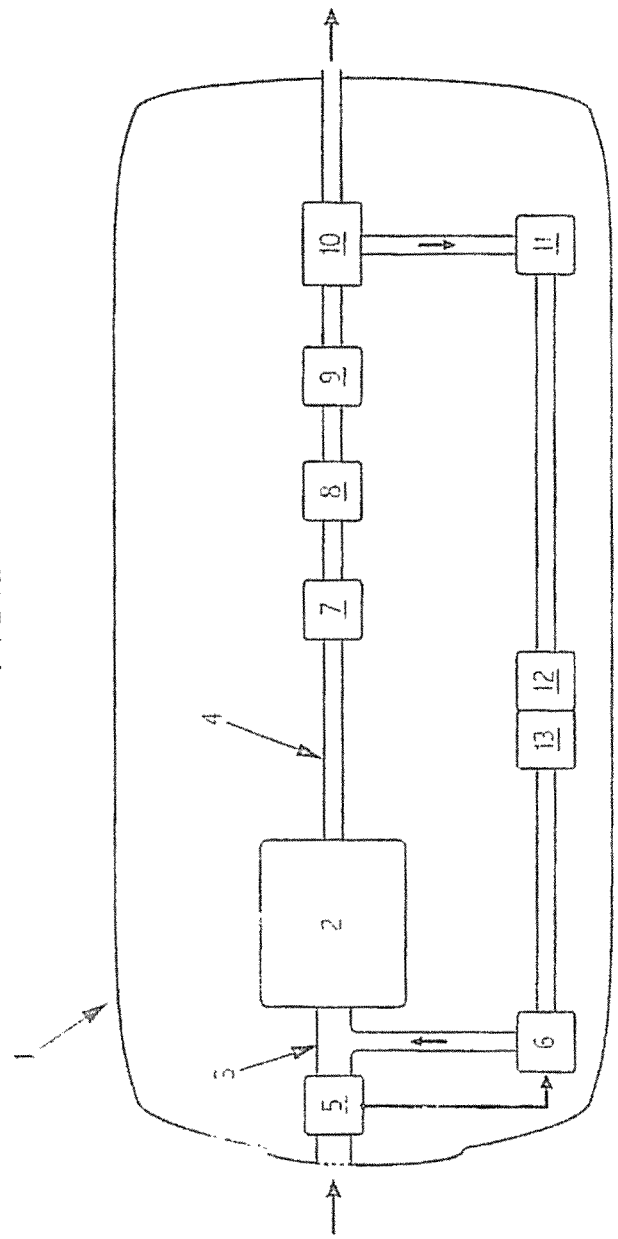
FIG. 2 shows a schematic of a motor vehicle with a device for implementing the method of FIG. 1.

FIG. 2 shows a motor vehicle 1 which has an internal combustion engine 2 with an intake line 3 and an exhaust gas line 4.

In the intake line 3 of the internal combustion engine 2 there is a means 5 for determining or adjusting the air/fuel ratio $\lambda$ of the air/fuel mixture supplied to the internal combustion engine 2. This means 5 is coupled to the control device of the motor vehicle 1 and optionally to a lambda probe located in the exhaust gas line 4 and controls the throttle valve for fresh air, the injection system for fuel and optionally also exhaust gas recirculation.

An addition means 6 for water is coupled to the intake line 3 or directly to the combustion chambers of the internal combustion engine 2 in order to feed water in the negative pressure region, i.e., for example downstream from the throttle valve which is not shown, to the air/fuel mixture. The addition means 6 has a control so that the amount of added water is controlled depending on the air/fuel ratio $\lambda$ determined by the means 5 in order to ultimately make available an amount of ammonia which has been optimized for exhaust gas treatment.

In the exhaust gas line 4 of the internal combustion engine 2, in succession there are a soot filter 7, a $NO_x$ storage catalytic converter 8 and an SCR catalytic converter 9 (Selective Catalytic Reduction). By means of this exhaust gas treatment arrangement soot is filtered out and nitrogen oxides are stored or released and converted.

For supply of the addition means 6, downstream from the internal combustion engine 2 there is moreover a recirculation means 10 which recirculates water from the exhaust gas following completed exhaust gas treatment with ammonia. The water obtained in this way is delivered to the addition means 6, its being watched that the amount of the recirculated water is more or less the same as the amount of added water. So that this amount of recirculated water does not exceed or only slightly exceeds the amount of added water, the recirculation means 10 which is made, for example, as a heat exchanger can be throttled in its performance or can be turned off.

So that the water conveyed from the recirculation means 10 to the addition means 6 can be used, there is moreover a pump means 11.

FIG. 2, moreover, shows a storage tank 12 which is used as a buffer. The storage tank 12 can also have a fill level means 13 so that the recirculation means 10 is easily controlled depending on the fill level means 13.

LIST OF REFERENCE NUMBERS 1 motor vehicle
2 internal combustion engine
3 intake line
4 exhaust gas line
5 means for determining or adjusting $\lambda$
6 addition means
7 soot filter
8 $NO_x$ storage catalytic converter
9 SCR catalytic converter
10 recirculation means
11 pump means
12 storage tank
13 fill level means

The invention claimed is:
1. An assembly for reducing the emission of nitrogen oxide in a system including an internal combustion engine provided with an intake line, an exhaust line, a nitrogen oxide storage catalytic converter in said exhaust line functional to convert hydrogen and nitrogen oxide in exhaust gases flowing in said exhaust line into water and ammonia and an SCR catalytic converter in said exhaust line functional to convert ammonia and nitrogen oxide into water and nitrogen, the assembly comprising:
- a conduit intercommunicating said exhaust line downstream of said SCR catalytic converter and said intake line, for conducting condensed water vapor emanating from said SCR catalytic converter;
- a pump disposed in said conduit; and
- a metering device disposed in said conduit between said pump and said inlet line, operatively responsive to a rich air/fuel ratio being supplied through said inlet line to said engine, the metering device adapted to meter an amount of said condensed water into said inlet line,
- wherein said metering device is operatively responsive to a selected signal of a lambda probe disposed in one of said inlet and exhaust lines such that the amount of water metered into the intake line is dependent upon the air/fuel ratio of the engine input.

2. An assembly according to claim 1 including a condenser adapted to condense water vapor emanating from said SCR catalytic converter and diverting condensed vapor to said conduit.

3. An assembly according to claim 1 including a soot filter in said exhaust line upstream of said nitrogen oxide catalytic converter.

4. An assembly according to claim 1 including a storage tank disposed between said pump and said metering device, the storage tank adapted to store water.

5. An assembly according to claim 4 including a fill-level device, adapted to detect the water level in said storing means.

6. An assembly according to claim 5 wherein the fill-level device is adapted to add water to said storing means responsive to a selective level of water therein.

* * * * *